March 16, 1926.
S. C. ENGLISH
1,576,639
APPARATUS FOR LOADING SHOCKS
Filed August 22, 1924 2 Sheets-Sheet 1
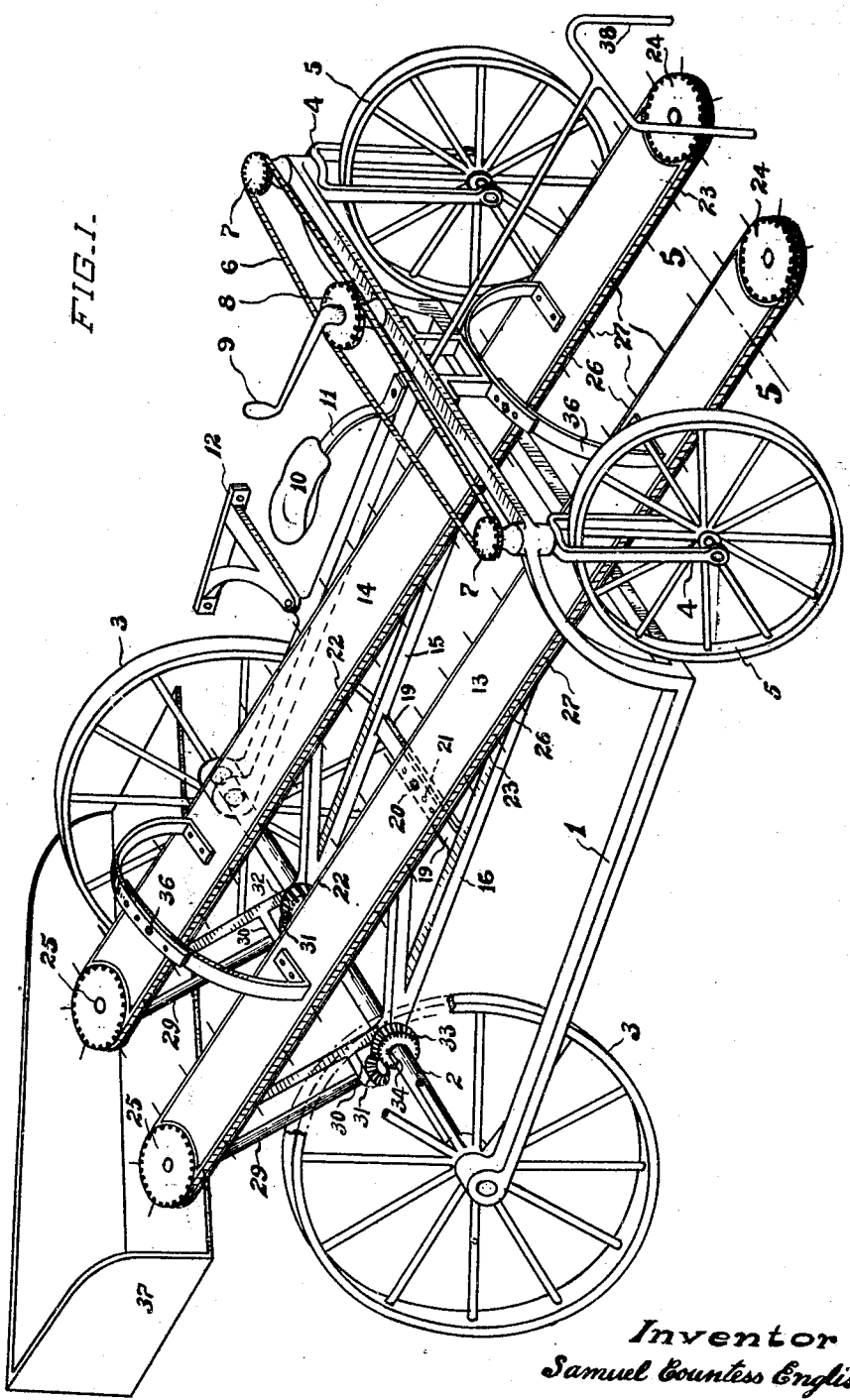
Inventor
Samuel Countess English
By Frederick E. Bromley
Atty.

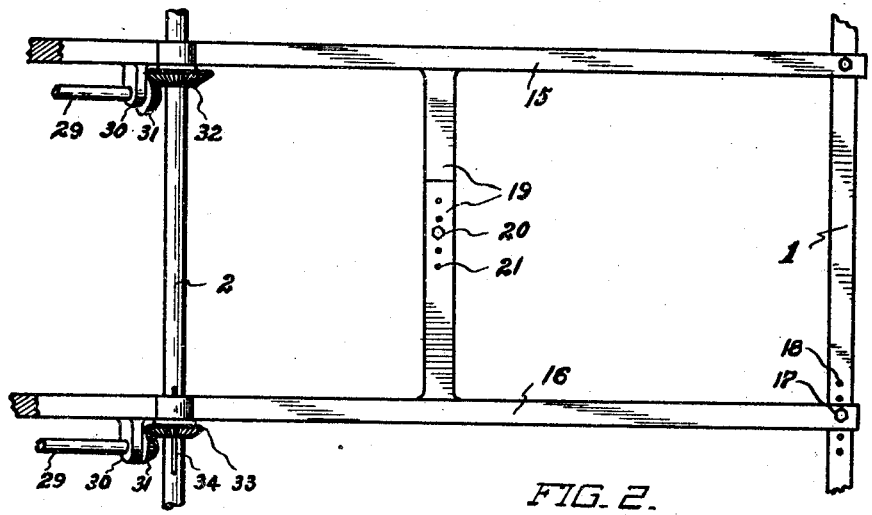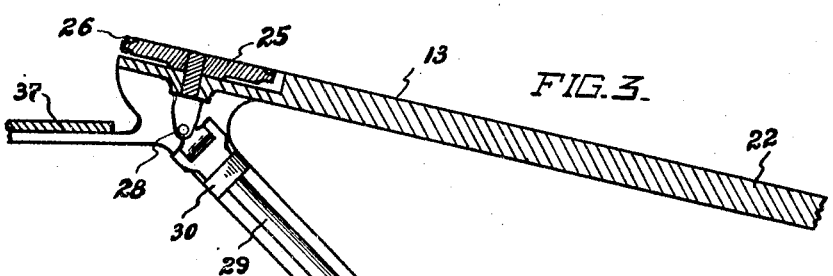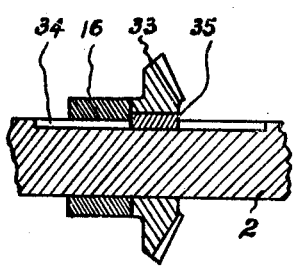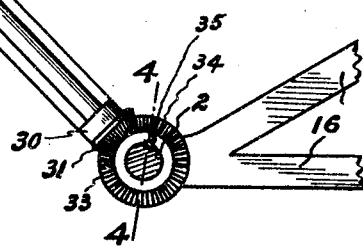

Patented Mar. 16, 1926.

1,576,639

UNITED STATES PATENT OFFICE.

SAMUEL COUNTESS ENGLISH, OF ORILLIA, ONTARIO, CANADA.

APPARATUS FOR LOADING SHOCKS.

Application filed August 22, 1924. Serial No. 733,561.

*To all whom it may concern:*

Be it known that I, SAMUEL COUNTESS ENGLISH, a subject of the King of Great Britain, residing on Rural Route #3, town of Orillia, in the Province of Ontario, in the Dominion of Canada, have invented new and useful Improvements in Apparatus for Loading Shocks, of which the following is a specification.

The invention relates to apparatus for loading shocks as described in the present specification and shown in the accompanying drawings which form part of the same.

The invention has for its object the provision of a simple and serviceable labour saving machine for the purpose of picking up and depositing shocks in a vehicle.

The invention consists essentially of a dirigible running-gear, a frame thereupon carrying an inclined conveying mechanism for elevating shocks from the ground, and a chute for receiving the shocks therefrom in order to convey them to the vehicle being loaded.

Referring to the drawings, Figure 1 is a general perspective view of the machine.

Figure 2 is a plan view of the frame for supporting the conveying mechanism.

Figure 3 is a fragmentary view, partly in section, of a conveyor frame and gearing for operably connecting an endless conveyor to the rear axle of the running gear.

Figure 4 is a detail section taken on the line 4—4 of Figure 3, showing the part of the gearing carried by the rear axle.

Figure 5 is a cross-sectional view of the endless conveyor before mentioned, such section being taken on the line 5—5 of Figure 1.

Like numerals of reference indicate corresponding parts in each figure throughout the drawings.

In the drawings, the machine consists of a substantial outer frame designated by the numeral 1, said frame being carried by a running gear comprising a live-axle 2, journalled in rearwardly positioned bearings, and comparatively large road wheels 3 rigidly secured to such axle. Also forming a part of this running-gear are forks 4 journalled at the forward end of the frame 1 in suitable bearings and provided with fairly small wheels 5; these forks being connected one to the other by a chain 6 passing over sprockets 7 rigid with the journals of said forks. This chain operating over the sprockets induces the forks to move in unison with each other, consequently imparting parallel direction of movement to their wheels 5. A further sprocket 8 of greater diameter to the aforesaid is rotatably mounted upon the frame 1 engaging the chain 6 intermediate of the sprockets 7 and extending from this sprocket is a handle 9 whereby the operator may arbitrarily turn the wheels 4 for steering purposes.

It is, of course, readily manifest that equivalent mechanism could be substituted for the chain connection between the forks 4 for steering and hence it is not intended to restrict the invention to the specific construction shown for this purpose.

10 is the driver's seat, such seat being secured to the frame 1 convenient to the handle 9 by a spring bar 11 as customary.

12 is a hitch pivotally attached to the far side of the frame 1 and arranged to connect to a rack or other vehicle for receiving shocks.

The inclined conveying mechanism for elevating shocks consists of companion endless conveyors 13 and 14 independently operated by gearing from the rear axle 2.

To support these conveyors an inner frame is provided consisting of a section 15, sustaining the conveyor 14, journalled upon the rear axle 2 and held against endwise movement by means conventional to the art; the forward end of this section being fastened to the outer frame 1.

A complementary section 16, sustaining the conveyor 13, is likewise journaled upon the rear axle in such a manner as to be free to shift longitudinally thereupon; its forward end being secured to said outer frame by a bolt 17 occupying one of a series of holes 18 provided for lateral adjustment of this section. The rearward portion of this latter section is securely held against lateral movement by a pair of intermediate straps 19 bolted together, as at 20, in overlapping formation; said straps being similarly provided with openings, as at 21, whereby adjustment may be made in conjunction with the forward end of the section 16 (clearly shown in Figure 2). It will be observed that by this construction of the inner frame, its section 15 rigidly carries the conveyor 14, whilst the conveyor 13 is adjustably sustained by the other section 16.

Each of the aforesaid conveyors consists of an elongated running-board 22 inclining forwardly and protruding beyond the front and rear road wheels 5 and 3 respectively; said boards being provided with marginal flanges 23 extending throughout their entire length, best discernible in Figure 5. The extremities of the boards 22 are cut away to receive sprockets.

In each of the cut-away portions of the forward extremities of said running boards 22 is journalled a sprocket 24; and similarly at the rear extremities are further sprockets 25.

Operably mounted over the front and rear sprockets of each running-board is an endless chain 26 having projections, as at 27, extending outwardly and being spaced at regular intervals therearound. These chains intermediate of their length are supported upon the respective flanges 23 of the running-boards, thus preventing them from sagging.

The rear sprockets 25 are each connected to a universal joint as at 28, Figure 3; and from each of such joints an angular shaft 29 depends, such shafts being carried by bearings 30 integral with or secured to the respective frame sections 15 and 16. The lower ends of the shafts are each provided with a bevel pinion 31.

Meshing with the pinion 31 of the conveyor 14 is a bevel gear 32 rigidly keyed to the rear axle 2 abutting the section 15 of the inner frame. Likewise engaging the pinion of the conveyor 13 is a bevel gear 33 slidably keyed to said rear axle in order to enable it to shift along the same with the adjustable section 16. The keying of this bevel gear is accomplished by cutting a protracted keyway 34 in the rear axle and securing a short key 35 to the bevel gear and allowing it to project into this keyway.

Co-acting to further secure the running boards 22 are arcuate members 36 consisting of bent straps adjustably secured one to the other by a bolt passing through one of a number of holes; one of said members being secured to the front of the outer frame in order to add to its rigidity.

Situated at the rear of the conveyors 13 and 14 is a transverse chute 37 which is supported by the sections 15 and 16 of the inner frame.

38 is a guide rigidly protruding from the frame 1 in advance of the conveyors 13 and 14, said guide being bifurcated in order to straddle shocks.

In the operation of the invention, the outer frame 1 is connected to a rack or other vehicle for the loading of shocks. The operator, upon occupying the seat 10, grips the handle 9 of the steering gear, and upon the machine being drawn directs it in a course consistent with that of the tractive vehicle. Upon approaching shocks the operator directs the machine so that the guide 38 will straddle the same, whereupon they are received by the conveying mechanism.

The rear road wheels 3 in their rotation revolve the axle 2 driving the bevel gears 32 and 33, which in turn coincidently operate the pinions 31 thus transmitting power to the shafts 29. As the shafts 29 are connected through universal joints 28 to the sprockets 25 of the conveyors 13 and 14, the same are driven thereby, thus revolving the endless chains 26 in unison. The projections 27 grip the shocks conveying them upwardly between the running boards 22 to the chute 37, which receives and conveys them to the receptacle of the vehicle being loaded.

Since shocks vary in size, it will be readily understood that the space between the conveyors will have to be regulated according to size of shocks intended to be loaded. This adjustment is made by removing the bolts 17 and 20 of the frame section 16, and also those of the members 36, whereupon the conveyor 13 with its supporting section can be shifted laterally to or from its companion 14. Upon this conveyor being set in its new position it is made fast by replacing the bolts previously removed.

What I claim is:—

1. In an apparatus for loading shocks, a wheeled frame, a pair of parallel sections constituting an articulate frame, means for securing one of said sections to the main frame, means for adjustably securing the other section to said main frame, a pair of rigid straps arranged to overlap each other, one of said straps extending from each section of the articulate frame, a bolt engaged in one of a series of apertures provided in each of said straps to unite them together, a pair of inclined endless conveyors, one mounted upon each of the aforesaid sections and having its rear end supported thereby, and arcuate members suspending the frontal ends of said conveyors from the aforesaid main frame.

2. In an apparatus for loading shocks, a wheeled frame, a pair of parallel sections constituting an articulate frame, means for securing one of said sections to the main frame, means for adjustably securing the other section to said main frame, a pair of rigid straps arranged to overlap each other, one of said straps extending from each section of the articulate frame, a bolt engaged in one of a series of apertures provided in each of said straps to unit them together, a pair of inclined endless conveyors, one mounted upon each of the aforesaid sections and having its rear end supported thereby, an arcuate strap affixed to the frontal end of one of said conveyors and to the aforesaid main frame, and a similar strap affixed to the frontal end of the other conveyor and bolted to the first mentioned strap.

Signed at Orillia, Canada, this seventh day of August, 1924.

SAMUEL COUNTESS ENGLISH.